United States Patent [19]

Han

[11] Patent Number: 4,646,903

[45] Date of Patent: Mar. 3, 1987

[54] BRAKE HOLDING SYSTEM

[76] Inventor: Joon Ho Han, 816 Gregorio Dr., Silver Spring, Md. 20901

[21] Appl. No.: 763,715

[22] Filed: Aug. 8, 1985

[51] Int. Cl.$^4$ ............................................. B60K 41/24
[52] U.S. Cl. .................................. 192/3 H; 192/4 A; 192/3 TR
[58] Field of Search ................... 192/3 H, 3 TR, 4 A; 188/265

[56] References Cited

U.S. PATENT DOCUMENTS

| | | |
|---|---|---|
| 1,927,209 | 9/1933 | Gilmore ............................ 192/3 TR |
| 2,313,232 | 3/1943 | Freeman ........................... 192/3 H |
| 2,642,484 | 6/1953 | Price . |
| 2,690,824 | 10/1954 | Forman . |
| 2,849,557 | 8/1958 | Long . |
| 2,938,611 | 5/1960 | Cooke . |
| 3,021,821 | 2/1962 | Prather . |
| 3,315,536 | 4/1967 | Claeys ............................. 192/3 TR |

*Primary Examiner*—George H. Krizmanich
*Attorney, Agent, or Firm*—Birch, Stewart, Kolasch & Birch

[57] ABSTRACT

A brake holding system for vehicles, comprising a vacuum and magnetic device including a brake holder, a moon gear having a plurality of teeth, a push rod connected to a master cylinder, a holding switch positioned for easy accessibility near the vehicle operator and a brake releasing switch operatively associated with the accelerator. The brake holding system can be placed into position after the vehicle is stopped, for example, at a stoplight, by actuating a switch. The brake is then automatically unlocked by depressing the accelerator pedal. Also, the driver can pull an emergency handle to mechanically release the brake.

9 Claims, 4 Drawing Figures

BRAKE HOLDING SYSTEM

BACKGROUND OF THE INVENTION

The present invention relates to an improved brake holding system of an automotive vehicle. More particularly, the present invention is directed to a brake holding system for vehicles comprising a vacuum magnetic device operatively associated with a brake holder and a moon gear member attached to a push rod connected to the master cylinder, said moon gear member having teeth on one side thereof whereby when the automobile is stopped by the application of the foot brake pedal for a period of time, for example, at a stoplight, by actuating a switch, the operator does not need to keep his foot on the brake pedal. The brake can then be automatically released when the accelerator pedal is depressed by the driver for advancing the automobile. In a further feature of the present invention, the brake holding system can be operated by pulling an emergency handle when the release system does not operate.

In many of the brake holding and releasing systems known in the art, the mechanisms are very complicated, rendering them unacceptable for commercial applicability or availability. Such brake controlling systems are shown in U.S. Pat. No. 2,642,484 to Price, U.S. Pat. No. 2,690,824 to Forman, U.S. Pat. No. 2,849,557 to Long, U.S. Pat. No. 2,938,611 to Cook, and U.S. Pat. No. 3,021,821 to Prather. The present applicant is also prosecuting another U.S. patent application Ser. No. 681,254, filed Dec. 13, 1984, which disclosed a brake holding system for vehicles wherein, when the automobile is stopped by the application of a foot brake pedal by the actuation of a switch, the operator does not need to keep his foot on the brake pedal and, thus, the brake can be automatically released when the accelerator pedal is depressed by the driver. However, this brake holding system cannot be applied as conveniently or reliably.

SUMMARY AND OBJECTS OF THE INVENTION

Accordingly, it is an object of the present invention to provide an improved brake holding system which is simple in construction and relatively inexpensive to manufacture.

Another object of the present invention is to provide a brake holding system which can safely lock a braking system on a vehicle by the simple actuation of a switch provided on the steering column.

A further object of the present invention is to provide a brake holding system which automatically unlocks the brake when the accelerator pedal is depressed.

Still another object of the present invention is to provide a brake holding system which is easy to operate and does not require the operator to keep the foot on the brake pedal at all times to prevent it from moving. Accordingly, it is particularly useful when the operator is a woman, a senior citizen or a young adult.

Yet another object of the present invention is to provide a brake holding system which is simple, inexpensive and can be readily installed on a used car.

A further object of the present invention is to provide a brake holding system comprising an emergency handle for releasing the brake in the event of failure of the automatic brake-releasing system of the present invention.

Yet another object of the present invention is to provide a brake holding system comprising a vacuum unit which is connected to the original vacuum system of the automobile.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention provides a brake holding system comprising a vacuum system and a magnetic unit including a brake holder and a moon gear member secured to a push rod which, in turn, is connected to the master cylinder. The moon gear member has teeth on the one side thereof for holding or releasing the brake system. Furthermore, an emergency handle can be added for providing an additional guarantee of safety.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
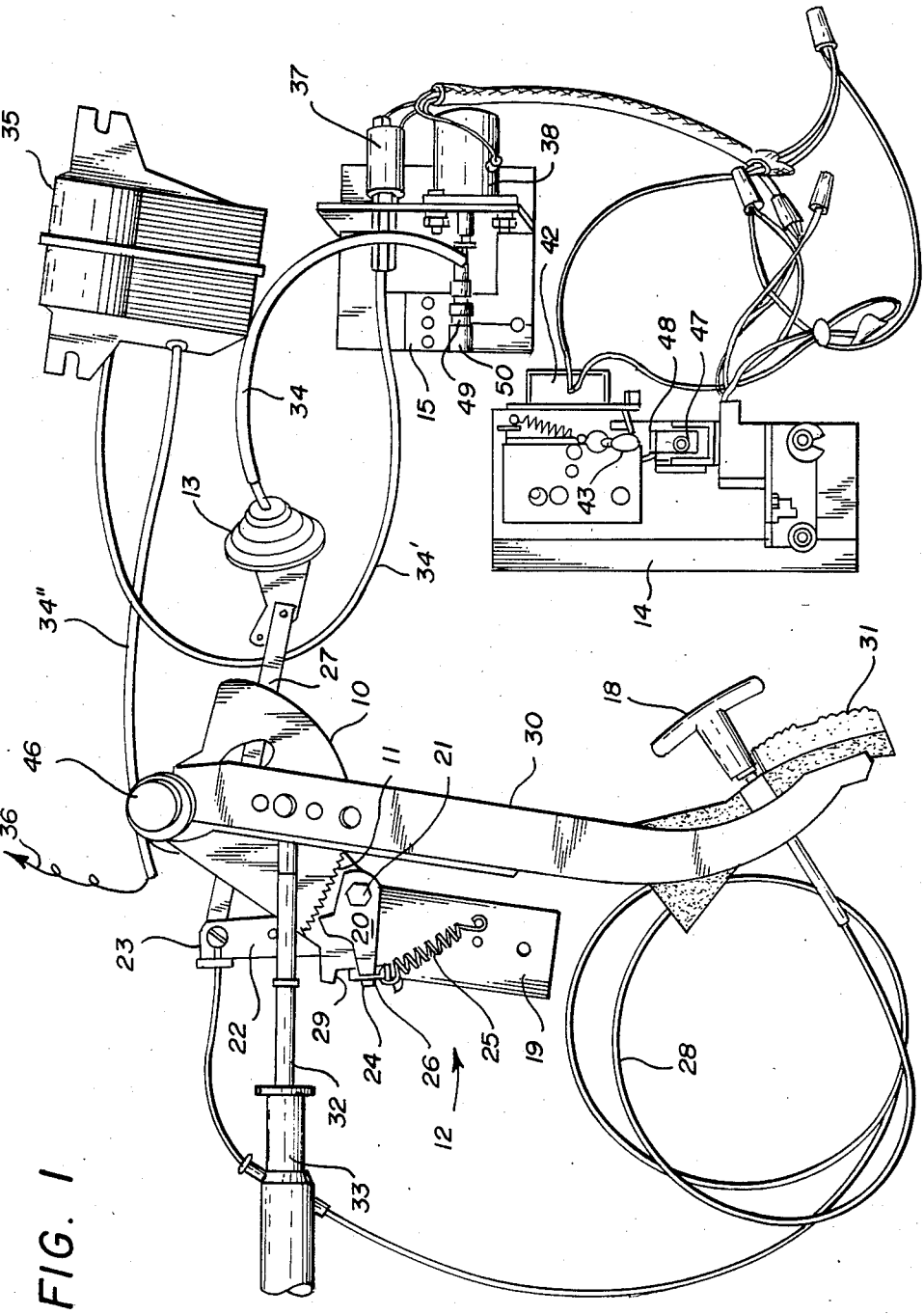
FIG. 1 is a perspective view showing components of the brake holding system of the present invention.
Figure 2:
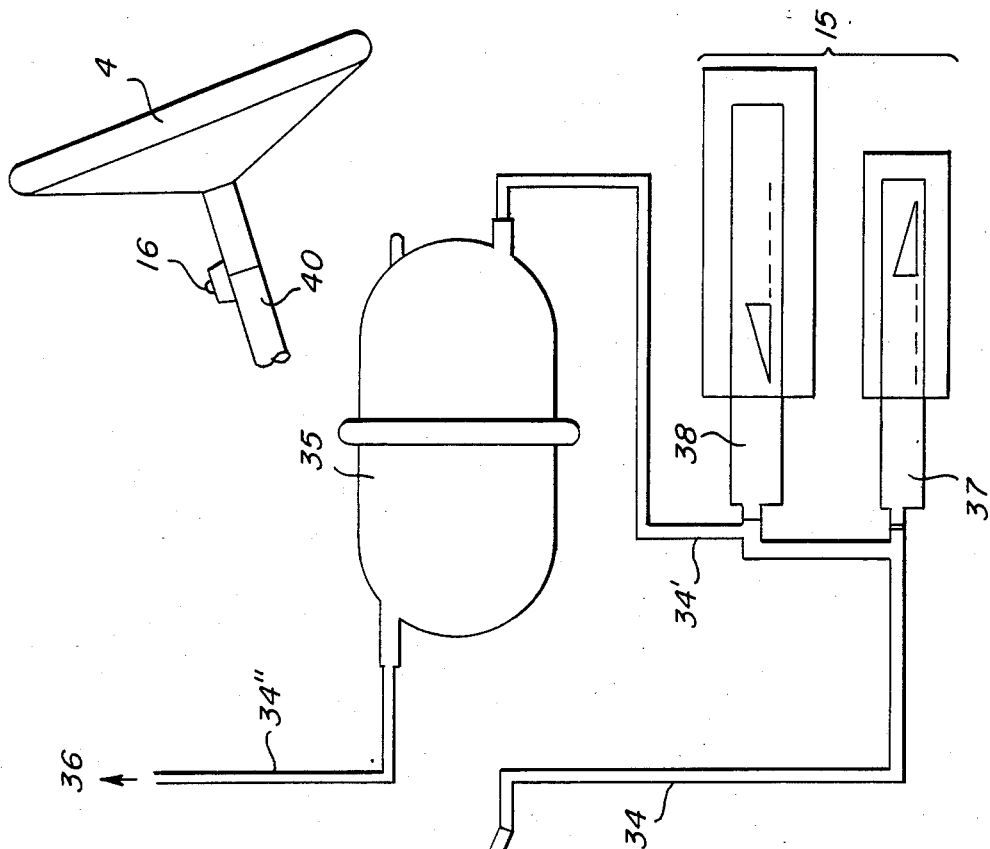
FIG. 2 is a diagrammatic view showing a part of the brake holding system of the present invention.
Figure 2:
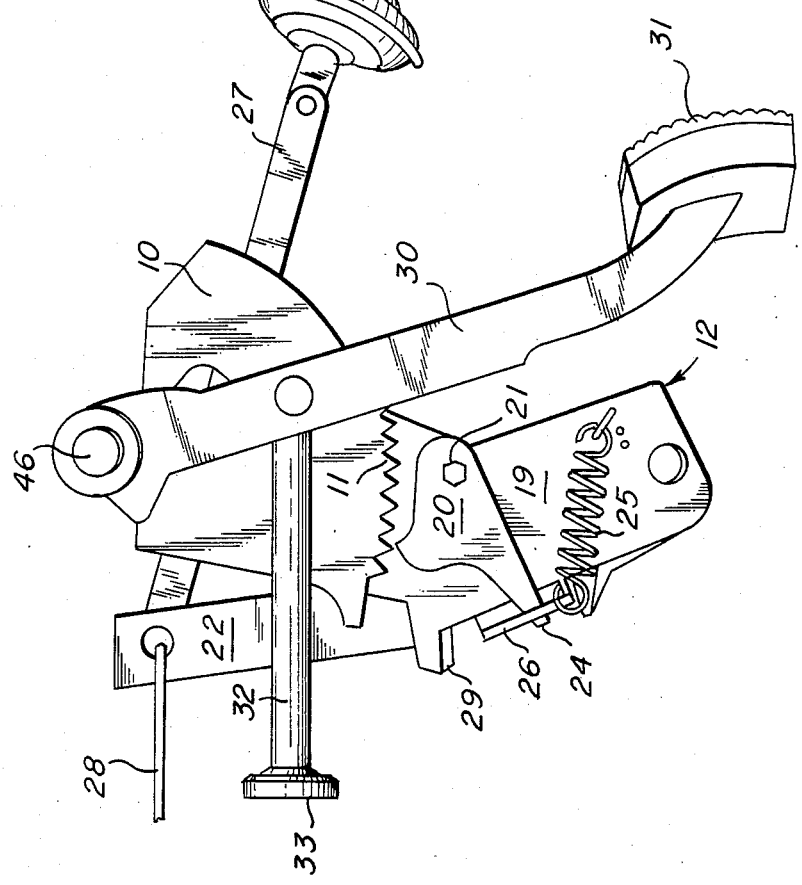

Referring now in detail to the drawings for the purpose of illustrating the present invention, the improved brake holding system of the present invention as shown in FIGS. 1 and 2 comprises a moon gear member 10 having a plurality of teeth 11 on one side thereof, a holding unit 12, a vacuum actuator 13, a magnetic device unit 14, an on/off member 15, a holding switch 16, a releasing switch 17 (FIG. 4) and an emergency handle 18.

Figure 3:
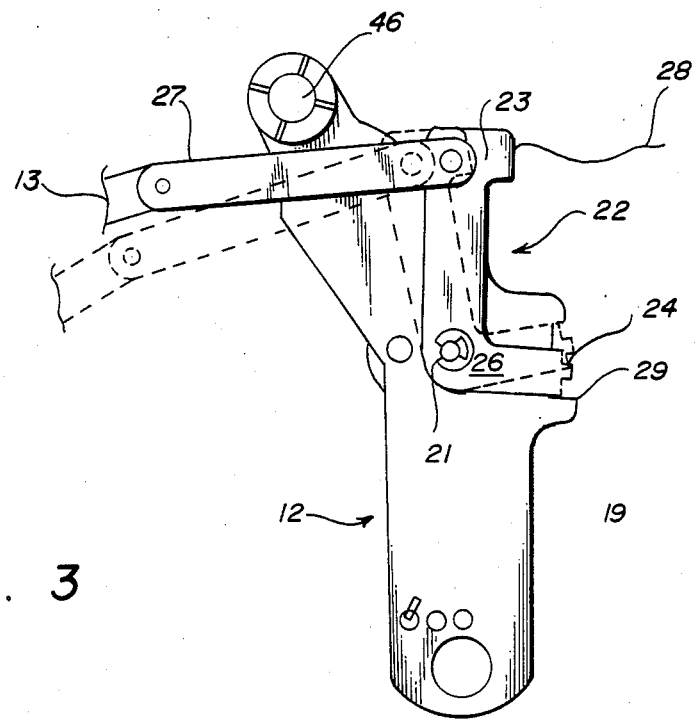
FIG. 3 is a diagrammatic view showing the back of the holding device of FIGS. 1 and 2.

As shown in FIGS. 1 and 3, the holding unit 12 comprises a base 19, a holder 20 connected to the base 19 by a pivot pin 21, a "C" shaped connecting member 22, having one end portion 26 connected both to an end port 24 of the holder 20 and to a bias spring 25, and the other end portion 23 thereof being connected to a vacuum actuator connector 27 and to a wire 28 which communicates with the emergency handle 18. The base 19 forms a slot 29 for engaging the portion 26 of the "C" shaped connecting member 22.

The moon gear member 10 has a moon-shaped configuration at the side formed with the teeth 11 so that the edge of the holder 20 cannot disengage from the teeth in the backward direction under any force after the holder 20 once engages the teeth 11 of the moon gear member 10. The moon gear member 10 is fixed to a shaft 46 which, in turn, is fixed to a brake pedal extension arm 30 of a brake pedal 31.

A push rod 32 is connected to a master cylinder 33 and is also attached to the brake pedal extension arm 30.

The vacuum chamber 13 is connected to the on/off members 15 through a hose 34 and either to the vacuum system 36 through a hose 34' and a hose 34" directly or to the vacuum system 36 through a vacuum tank 35 by the hose 34' and the hose 34".

Figure 4:
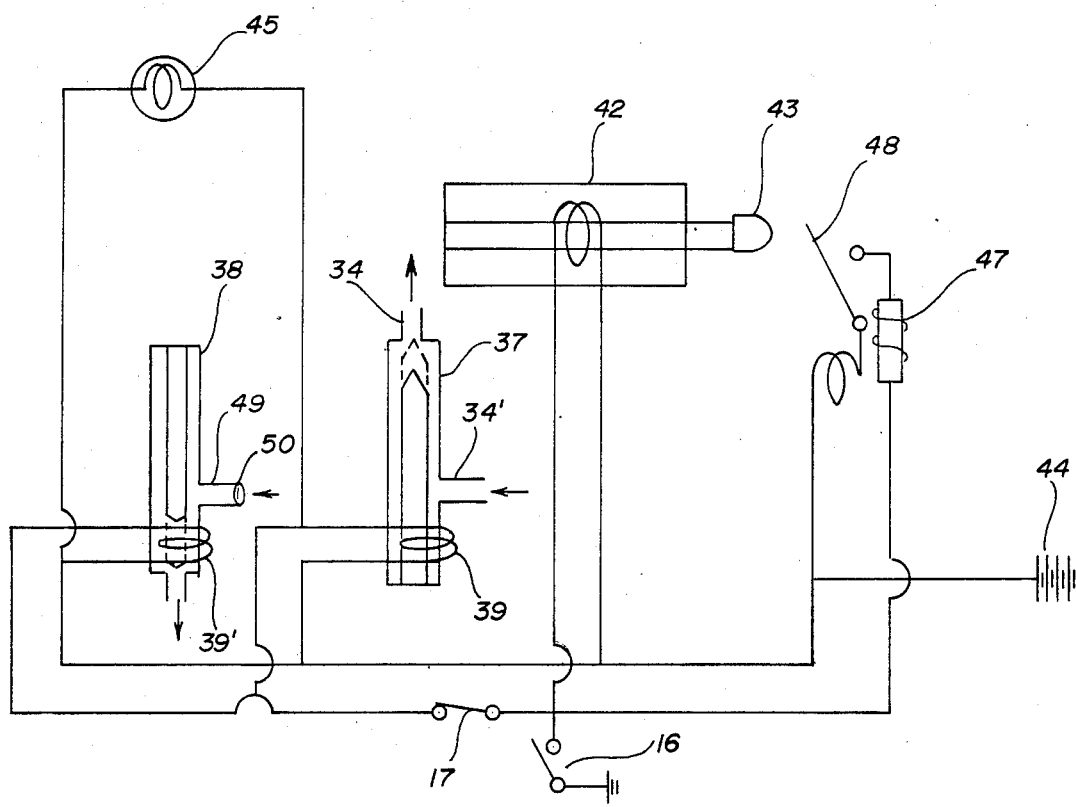
FIG. 4 shows the electronical circuit of the vacuum and magnetic system of the brake holding system of the present invention.

The on/off-members 15 comprise an on-member 37 and an off-member 38, said members being alternately opened or closed by the magnetic force of magnetic coils 39 and 39' disposed at the lower end of the members 37 and 38, respectively, as shown in FIG. 4.

In operation, when the vehicle is stopped for a fixed period of time such as, for example, at a stoplight, and the brake pedal is applied, the driver engages the holding switch 16 on the steering column 40 of steering wheel 41 and a solenoid magnetic coil 42 is actuated to function as a magnet. A touch relay switch 43 of the solenoid magnetic coil 42 touches to a touch switch 48 and to a magnetic member 47, and completes the circuit with the battery 44 so that the on-member 37 provides communication through the hose 34' to the vacuum tank 35 or the vacuum system 36 through the hose 34". At this time, the off-member 38 is maintained in the closed position. When the driver does not depress the accelerator, the releasing switch 17 is on-position and the on-member 37 is opened to communicate between the hoses 34' and 34. On the other hand, the off-member 38 is closed to prevent from communicating an air entrance 49 containing a filtration member 50, because the magnetic coils 39 and 39' magnetized respectively. Immediately, the vacuum actuator 13 pulls the connector 27, and the brake holder 20 engages the teeth 11 of the moon gear member 10 indirectly fixed to the push rod 32. At this time, there is no need to apply further pressure to the brake pedal 31 since the brake holder 20 is holding the moon gear member 10; that is, the push rod 32 is in a fixed state relative to the master cylinder 33.

On the other hand, when the accelerator (not shown in the drawings) is depressed, the releasing switch 17 (Fig. 4) is opened and demagnetizes the magnetic coils 39 and 39' of the on/off members 37 and 38 which causes the off-member 38 to communicate with the air through the air entrance 49 and the filtration member 50. Simultaneously, the on-member 37 closes to interrupt the vacuum which causes the brake holder 20 to retract to its original position due to the bias of the spring 25.

Because the magnetic coil 39 of the on-member 37 is not energized and the vacuum chamber 13 is not functioning and because the vacuum actuator 13 cannot now pull the connector 27, a lamp 45 disposed on the dashboard indicates the operation of both the holding and releasing condition. Also, when the releasing switch 17 is opened by pushing the accelerator, the magnetic coil 39 of the on-member 37 is rendered non-operative because the switch 16 is not maintained in a continuously closed state.

If the releasing mechanism of the present invention gets out of order, the driver can pull the emergency handle 18 connected to the one portion 23 of the connecting member 22 through the wire 28 (FIG. 1) so that the holder 20 can be mechanically released from the teeth 11 of the moon gear 10.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A brake holding system for a vehicle having, in combination, a brake pedal, an accelerator pedal, a master cylinder, a vacuum system and a power supply, which comprises
    a moon gear having a plurality of teeth on one side thereof, said moon gear being operably connected to the master cylinder,
    a spring biased holding unit adapted to engage the teeth of the moon gear, against said spring bias whenever the holding system is activated,
    an on/off member,
    a vacuum actuator providing communication between said holding unit and said on/off member,
    a holding switch communicating with said on/off member for activating said holding unit against said spring bias to engage said moon gear, and
    a releasing switch communicating with said on/off member for disengaging said holding unit upon the depression of the accelerator pedal.

2. The brake holding system of claim 1, further including an emergency brake handle connected to the holding unit whereby, upon the actuation of the brake handle, the holding unit disengages from the teeth of the moon gear.

3. The brake holding system of claim 1, wherein the moon gear has a moon-shaped configuration on the side provided with teeth.

4. The brake holding system of claim 1, wherein the holding unit contains a "C" shaped connecting member, said holding unit forming a slot for engaging with one portion of the connecting member.

5. The brake holding system of claim 1, wherein the vacuum actuator communicates with the vacuum system via the on-off member.

6. The brake holding system of claim 1, wherein the on/off member has an air entrance containing a filtration member for the air.

7. The brake holding system of claim 1, wherein the on/off member has an outlet disposed at the lower portion thereof to communicate with the vacuum system.

8. The brake holding system of claim 1, wherein the holding switch is a one-touch switch.

9. The brake holding system of claim 1, wherein the releasing switch is in the off condition when the accelerator is depressed.

* * * * *